(12) United States Patent
Veldhuizen

(10) Patent No.: US 11,372,837 B2
(45) Date of Patent: Jun. 28, 2022

(54) TRANSACTION REPAIR

(71) Applicant: Infor (US), LLC, New York, NY (US)

(72) Inventor: Todd L. Veldhuizen, Waterloo (CA)

(73) Assignee: INFOR (US), LLC, New York, NY (US)

( * ) Notice: Subject to any disclaimer, the term of this patent is extended or adjusted under 35 U.S.C. 154(b) by 521 days.

(21) Appl. No.: 16/272,017

(22) Filed: Feb. 11, 2019

(65) Prior Publication Data

US 2019/0171631 A1 Jun. 6, 2019

Related U.S. Application Data

(63) Continuation of application No. 14/662,457, filed on Mar. 19, 2015, now Pat. No. 10,204,126.

(60) Provisional application No. 61/955,890, filed on Mar. 20, 2014.

(51) Int. Cl.
*G06F 16/00* (2019.01)
*G06F 16/23* (2019.01)
*G06F 9/46* (2006.01)

(52) U.S. Cl.
CPC .......... *G06F 16/2315* (2019.01); *G06F 9/466* (2013.01)

(58) Field of Classification Search
None
See application file for complete search history.

(56) References Cited

U.S. PATENT DOCUMENTS

2003/0217033 A1\* 11/2003 Sandler ............... G06F 16/2272
2004/0068501 A1\* 4/2004 McGoveran ........... G06Q 20/10
2008/0256103 A1\* 10/2008 Fachan .................. G06F 9/466
2010/0070955 A1 3/2010 Kahlon
2011/0153566 A1 6/2011 Larson et al.
2012/0324472 A1 12/2012 Rossbach et al.
2013/0055269 A1 2/2013 Sukenari
2013/0110883 A1 5/2013 Junqueira et al.

(Continued)

OTHER PUBLICATIONS

Xiao Yang et al: "Recovery of Concurrent Processes in a Service Composition Environment Using Data Dependencies", Nov. 9, 2008 (Nov. 9, 2008), ICEC 2006; [Lecture Notes in Computer Science; Lect.Notes Computer], Springer International Publishing, Cham, pp. 139-156.

(Continued)

*Primary Examiner* — Thu Nguyet T Le
(74) *Attorney, Agent, or Firm* — Alston & Bird LLP

(57) ABSTRACT

An aspect includes concurrently executing two or more transactions over a database. A plurality of transactions is executed in parallel while recording each transaction's sensitivities and output deltas. A sensitivity of a transaction identifies an aspect of a database state whose modification has a potential of altering an output of the transaction, and an output delta of the transaction indicates a change to the database state that is a result of the transaction being executed. The output deltas are fed from a first transaction through a filter for a second transaction. The filter is based on the second transaction's sensitivities. The filtered deltas are processed in the second transaction to incrementally compute revised deltas and sensitivities for the second transaction. For each transaction that successfully commits, the transaction's deltas are applied to update the database.

20 Claims, 10 Drawing Sheets

(56) References Cited

U.S. PATENT DOCUMENTS

2013/0246845 A1    9/2013  Parkinson

OTHER PUBLICATIONS

Zhichao Yan et al: "An integrated pseudo-associativity and relaxed-order approach to hardware transactional memory", ACM Transactions on Architecture and Code Optimization, Association for Computing Machinery, 2 Penn Plaza, Suite 701 New York NY 10121-0701 USA, vol. 9, No. 4, Jan. 20, 2013 (Jan. 20, 2013), pp. 1-26.
Todd L. Veldhuizen, "Leapfrong Triejoin: A Simple, Worst-Case Optimal Join Algorithm" Sep. 2013, 12 pages.
Todd Veldhuizen, "Incremental Maintenance for Leapfrog Triejoin" Mar. 2013, 19 pages.

* cited by examiner

TRANSACTION REPAIR

CROSS-REFERENCE TO RELATED APPLICATION

This application is a continuation of U.S. Non-Provisional patent application Ser. No. 14/662,457, filed Mar. 19, 2015, which claims benefit under 35 U.S.C. § 119(e) of U.S. Provisional Patent Application No. 61/955,890, filed Mar. 20, 2014. The entire contents and substance of all of the above applications are incorporated herein by reference in their entireties as if fully set forth below.

BACKGROUND

The present invention relates generally to transaction processing and, more specifically, to supporting high throughput concurrent transactions without locks.

Transactions are units of change to a database. Transactions arise in real-world situations, such as when a person purchases items at a supermarket checkout, or when a person transfers money between bank accounts. Database management systems support transactions by guaranteeing certain fundamental properties: atomicity (the transaction executes in its entirety and cannot leave partial results); consistency (transactions are rejected if their updates would violate integrity constraints); isolation (transactions operate in a way that appears independent of other concurrent transactions); and durability (the effects of a committed transaction are permanent).

Many users may submit transactions concurrently to a database. If transactions operate on disjoint data, these transactions can proceed safely since there is no interaction between them. However, if two concurrent transactions access a common data item, and at least one of them is writing that data item, then an interaction is possible. The consequences of such an interaction can be serious, including the creation of a database state that could not have arisen had the transactions been executed in some serial order. The well-accepted definition of transaction schedule correctness, known as "serializability" requires that the database state be equivalent to one that would have resulted from some serial execution. Therefore, database management systems must somehow control the accesses made by transactions to avoid such undesirable interactions between transactions.

There are many well-known concurrency control algorithms in the literature. The simplest method is to run transactions one at a time, but such an algorithm performs poorly because no parallelism is possible. The two-phase locking (2PL) approach locks data items as they are read and written, and forces a lock request to wait if another transaction holds a conflicting lock on the same item. Optimistic concurrency control methods proceed without locking, but record an inventory of data items read and written. A check is made at transaction commit time to see if there may have been any conflicting operations made by recently committed transactions. If so, the transaction is aborted and restarted. In situations where the conflict probability is high, many transactions will be aborted. Yet another concurrency control method relies on timestamps. Data items have associated timestamps, and transactions are allowed to read and write data items only if the timestamp on the item is no later than the timestamp of the transaction. A transaction that violates this requirement is aborted and restarted with a new timestamp. A variant of timestamp based concurrency control keeps multiple versions of each data item, so that transactions can access older versions of the data items and thus abort less often. Each of these methods has drawbacks including delays caused by locks and wasted work caused by aborted transactions.

SUMMARY

Embodiments include a method, system, and computer program product for concurrently executing two or more transactions over a database. A plurality of transactions are executed in parallel while recording each transaction's sensitivities and output deltas. A sensitivity of a transaction identifies an aspect of a database state whose modification has a potential of altering an output of the transaction and an output delta of the transaction indicates a change to the database state that is a result of the transaction being executed. The output deltas are fed from a first transaction through a filter for a second transaction. The filter is based on the second transaction's sensitivities. The filtered deltas are processed in the second transaction to incrementally compute revised deltas and sensitivities for the second transaction. For each transaction that successfully commits, the transaction's deltas are applied to update the database.

Additional embodiments include a method, system and computer program product for concurrently executing two or more transactions over a database. A circuit is defined that links a plurality of transactions recursively based on a serial order. The transactions are executed in parallel while recording each transaction's sensitivities and output deltas. A sensitivity of a transaction indicates an aspect of a database state whose modification has a potential of altering an output of the transaction and an output delta of the transaction indicates a change to the database state caused by execution of the transaction. The deltas and sensitivities are propagated according to the circuit. The filtered deltas in each transaction are processed to incrementally compute revised deltas and sensitivities. The propagating and processing are repeated until no more changes are observed. For each of the transactions that successfully commits, the transaction's deltas are applied to update the database.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features and advantages of the invention are apparent from the following detailed description taken in conjunction with the accompanying drawings in which:

DETAILED DESCRIPTION

Embodiments of the present invention relate generally to transaction processing and, more specifically, to supporting high throughput concurrent transactions without locks. Embodiments are directed to scheduling and executing a set of transactions concurrently. Dependencies between the transactions are identified when the output of one transaction could potentially influence the outcome of a second transaction. Rather than aborting and restarting the second transaction, the system incrementally adjusts the execution of the second transaction to reflect the changes made by the first transaction. In many situations this incremental adjustment of the second transaction is significantly faster than aborting and restarting that transaction. To support incremental adjustments, transactions are executed using algorithms that record intermediate results in a fashion that allows for efficient incremental processing.

Figure 1:
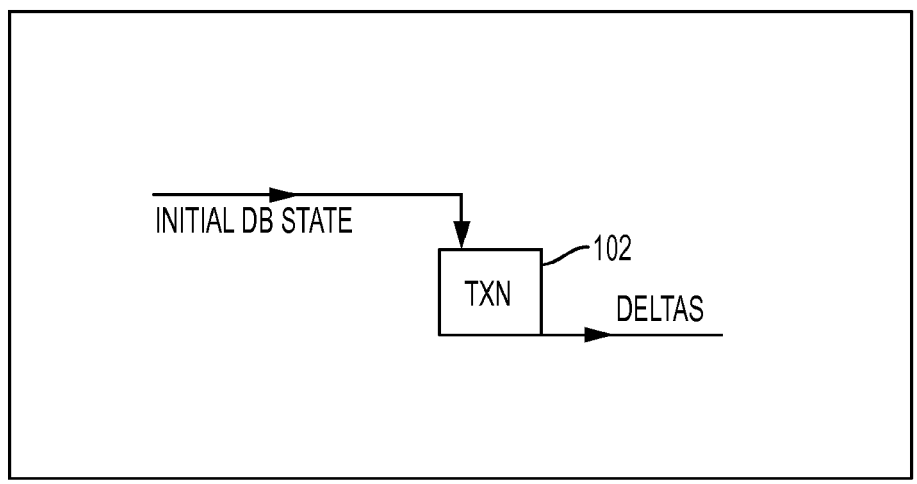
FIG. 1 depicts a single transaction operating over a database in accordance with an embodiment.

Turning now to FIG. 1, a single transaction 102 operating over a database is generally shown in accordance with an embodiment. A transaction can be viewed as a black box which takes an initial database state and produces changes to the database state, referred to herein as "deltas." The initial database state is read and the transaction 102 determines certain database records to insert, delete, and/or change. Collectively, these insertions, deletions and updates (the deltas) and are shown as the output of the execution of the transaction 102 in FIG. 1. When a transaction running in isolation commits, its deltas are applied to the database, changing the database state.

Figure 2:
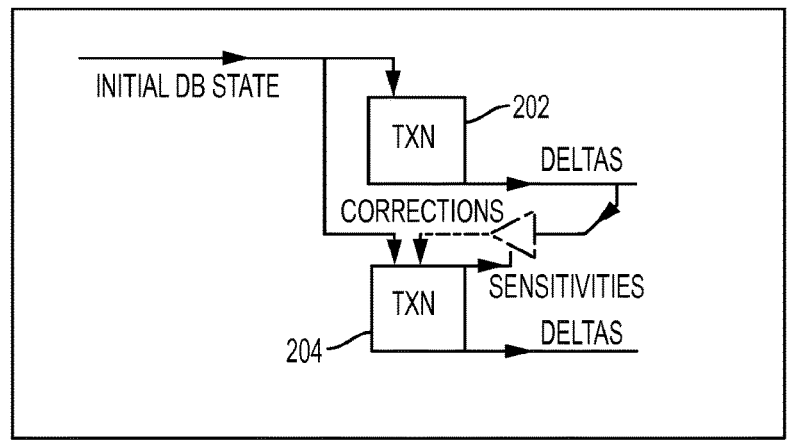
FIG. 2 depicts two interacting transactions operating over a database in accordance with an embodiment.

Turning now to FIG. 2, two interacting transactions 202 204 are generally shown operating over a database in accordance with an embodiment. The transactions have a serialized order, that is, the system should behave as if transaction 202 executed prior to transaction 204. As shown in FIG. 2, the transaction 202 and transaction 204 execute in parallel, initially oblivious to any data items that they may both be accessing concurrently. The system resolves the potential conflicts by feeding the deltas from the first transaction 202 into the second transaction 204. The second transaction 204 specifies filters to indicate possible deltas to which the second transaction 204 may be sensitive. Any deltas that meet these filters (the "filtered deltas") are interpreted as corrections for the second transaction 204, since the system is trying to achieve an equivalent serial order in which the transaction 202 is first and transaction 204 is second. Conceptually, the transaction 204 should see not the initial database state, but the database state modified according to the deltas provided by the first transaction. The process of incrementally adjusting the effects of a transaction based on the effects of earlier transactions is referred to herein as transaction repair.

FIG. 2 depicts an embodiment that corrects for cases where the second transaction 204 in a proposed serialized order tries to read some state affected by deltas of a first transaction 202. As shown in FIG. 2, transactions report their sensitivities, that is, aspects of a database state whose modification might alter the outcome of the transaction. The deltas of the first transaction 202 are compared to the sensitivities declared by the second transaction 204 to test whether there is a possibility of conflict. If a conflict is possible, the relevant corrections of the database state are input to the second transaction 204, which is then repaired (i.e., incrementally maintained) for the corrections. FIG. 2 is a simple example of a transaction repair circuit. In an embodiment, it is not a circuit in the sense of custom hardware, but rather a schematic describing the work to be performed. The deltas, corrections, and sensitivities can be implemented as signals. The triangle element is a correction operator or filter; it takes as inputs changes to the database state (e.g., deltas) and declared sensitivities, and selects just those deltas that match sensitivities.

In an embodiment, sensitivities are identified by building a data structure that summarizes the subset of the data being operated on by a transaction. Transactions can report their sensitivities by making this data structure accessible to a flow of changes (deltas) coming from earlier transactions. If a change is determined to overlap the data subset characterized by the data structure, then the second transaction is said to be sensitive to that change.

Figure 3:
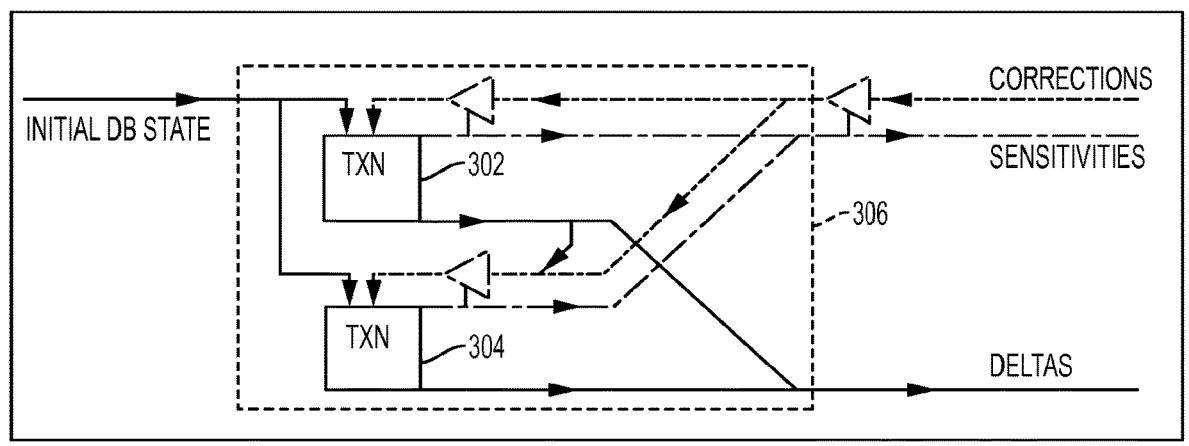
FIG. 3 depicts two concurrent transactions grouped together into a repair circuit in accordance with an embodiment.

An advantage of this form of transaction repair is that it can be scaled with the number of concurrent transactions. FIG. 3 shows how two concurrent transactions (transaction 302, transaction 304) can be grouped together into a repair circuit 306 in accordance with an embodiment. Within the circuit 306, transaction repair happens between the two component transactions (transaction 302, transaction 304) as described previously. Externally, the circuit 306 itself can be seen as a coarser-level transaction that outputs deltas, provides sensitivities, and accepts corrections in a fashion analogous to a single transaction.

Figure 4:
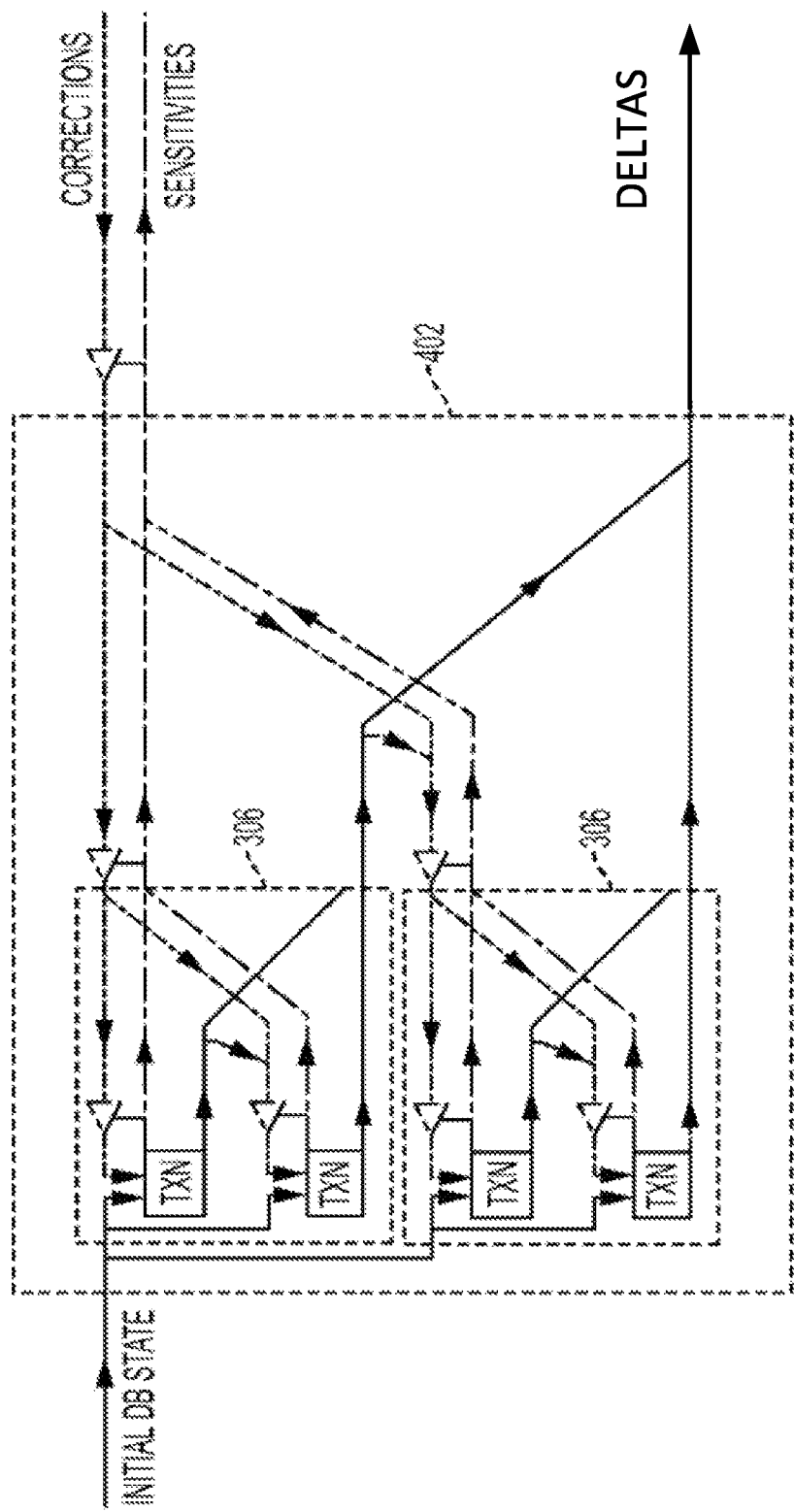
FIG. 4 depicts two concurrent repair circuits grouped together into a coarser repair circuit in accordance with an embodiment.

FIG. 4 shows how such circuits 306 can themselves be grouped into an even coarser circuit 402 in accordance with an embodiment. The underlying transactions operate in parallel, and the first-level repair happens within the two inner circuits 306 in parallel. A second level of repair then occurs within the outer circuit 402. This outer repair may propagate deltas from the top inner circuit 306 to the bottom inner circuit 306 based on the sensitivity information. If necessary, the bottom inner circuit 306 can undergo repair again, in response to the new deltas.

Figure 5:
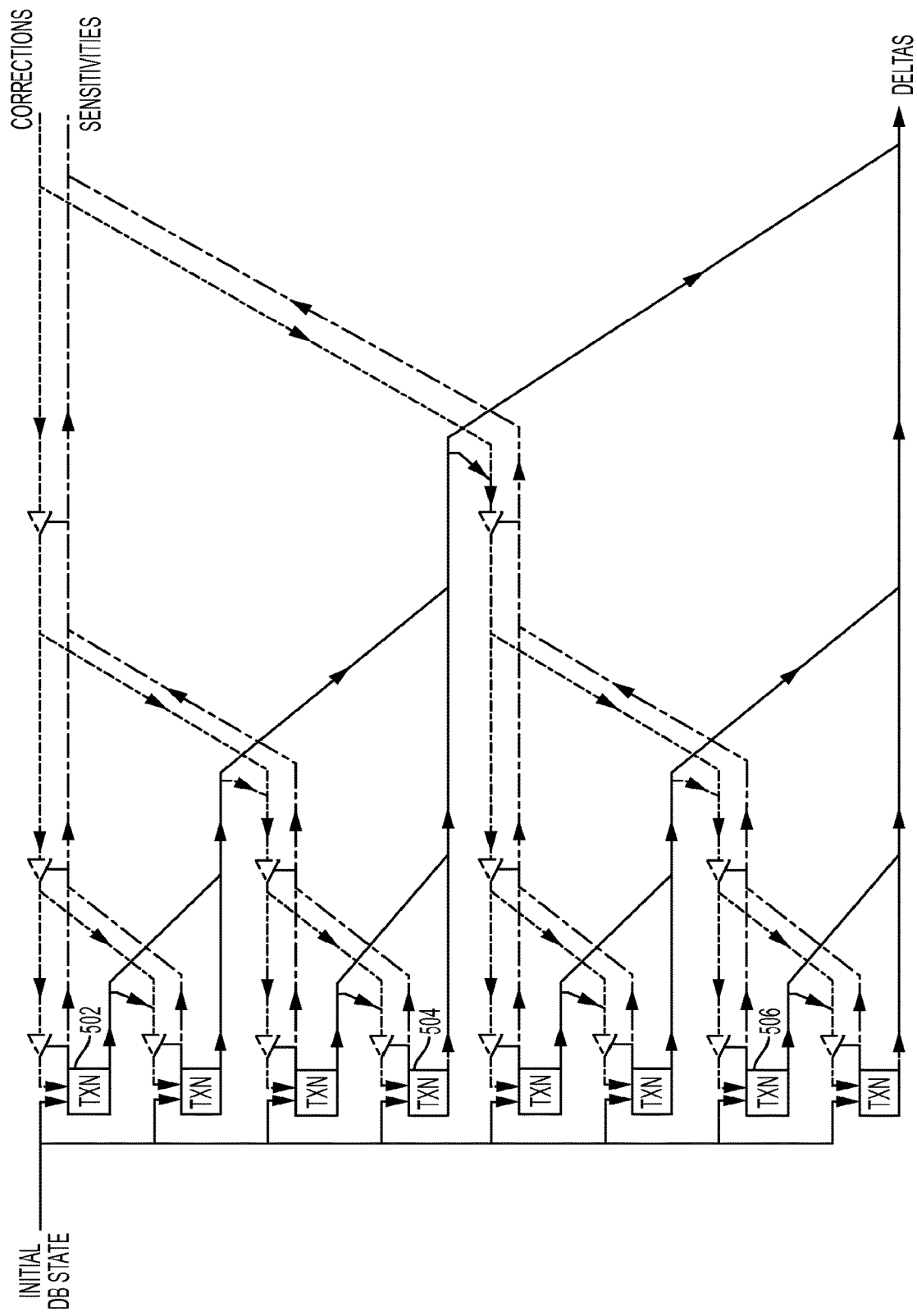
FIG. 5 depicts a propagation of deltas and repairs in a circuit containing eight transactions in accordance with an embodiment.

Turning now to FIG. 5, a propagation of deltas and repairs in a circuit containing eight transactions is generally shown in accordance with an embodiment. In FIG. 5 deltas from the first transaction 502 are propagated as corrections to the fourth transaction 504, and deltas from the fourth transaction 504 are propagated as corrections to the seventh transaction 506. The delta/correction chain shown in FIG. 5 might happen because the first transaction 502 writes a value that is read by the fourth transaction 504 and affects the output of the fourth transaction 504; an item written by the fourth transaction 504 may, in turn, influence the seventh transaction 506 in a similar way.

In different embodiments, transactions may be written in one of several different languages. In one embodiment, transactions are written as sets of logical rules, with updates determined by expressions appearing on the left hand side of an implication. For example, the rule:

$$+p(X,Z) \leftarrow r(X,Y), s(Y,Z,W), W > 7$$

specifies that a record (X,Z) should be added to table "p" when the current database state has records in tables "r" and "s" that meet the conditions specified on the right hand side. Thus, if the database contained r(a,b) and s(b,c,10), then p(a,c) would be added to the database as a result of executing a transaction containing this rule. Alternative embodiments can use other languages such as SQL or PL/SQL to specify transactions. In SQL, the above rule can be written as:

Insert into p select x,z from r,s where r.y=s.y and w>7

Embodiments are described using a rule-based language for expressing transactions are described, however embodiments can be implemented using any language that expresses transactions.

One correction method is to re-compute a later transaction from scratch in the new database state, after deltas from earlier transactions have been applied. However, such a scheme is inefficient because it wastes partial work done by the later transaction. Instead, embodiments of transaction repair described herein assume that transactions can incrementally adjust their execution in the face of new deltas. To do so, a transaction must be able to specify some data structure embodying its sensitivities. A transaction must also be able to incorporate delta information in an incremental fashion that avoids repeated work.

In a first embodiment, transactions execute using incremental algorithms such as a symmetric hash join, which is well known in the art. In a symmetric hash join, hash tables are built on the join key for both participating tables. When a delta record for one of the participating tables is received, the corresponding key is probed in the opposite table to search for matches. Any matches result in the output of a change record for the join. The delta record also results in a modification for the stored hash table.

For example, consider the rule mentioned above as a transaction T, and suppose that hash tables have been built, one for r and one for the fragment of s with W>7. Suppose that r(a,b) and s(b,c,10) were initially in the database, and so p(a,c) is derived by T based on the initial database state. In the meantime, another concurrent transaction earlier in the serialization order may have generated a delta+s(b,d,12), meaning that the record (b,d,12) is added to table s. T can incrementally process this delta as follows. First, the third attribute is examined to see if it is larger than 7, which is required by the transaction specification. If so, records matching b are located in the hash table for r, yielding an extra output record p(a,d). Finally, (b,d,12) is added to the hash table for s, so that future deltas can be processed correctly. In this example, the condition (W>7) and the two hash tables themselves constitute the data structures where sensitivity information is recorded. In this example, the filtering step involves looking for a match to a record from the delta in the hash table for the opposite table. The hash tables enable incremental evaluation of the transaction in the face of new deltas.

In another embodiment, transactions execute using an incremental algorithm such as the leapfrog trie-join described in "Incremental Maintenance for Leapfrog Triejoin" by Todd L. Veldhuizen, arXiv: 1303.5313, March 2013. Consider again the example involving transaction T above. The leapfrog trie-join would maintain sensitivity indexes for tables r and s. A sensitivity index contains a sorted list of keys representing the trace of a merge-join over the keys. In this example, there would be three sensitivity indexes for s and two for r:

S0([Y,Y'],X)
S1(Y,[Z,Z'],X)
S2(Y,Z,[W,W'],X)
R0([X,X'])
R1(X,[Y,Y'])

The intervals within square brackets are sensitivity intervals, and other variables represent context keys within which those sensitivity intervals are relevant. The left-to-right ordering of variables reflects the lexicographic ordering of the sensitivity indexes.

Updates can be evaluated against the trace to determine whether the trace would have been affected by the update. If so, a subrange of the key range is identified and used to incrementally determine changes to the join result. In the example above, where +s(b,d,10) is part of the delta from an earlier transaction, the sensitivity indexes and database tables would be consulted to determine whether the update could potentially affect the trace, and if so the changes in the output deltas that result from the input deltas. Updates to the sensitivity indexes themselves may also be required to reflect the input deltas. Details describing the incremental operation of leapfrog trie-join are known in the art and can be found in "Incremental Maintenance for Leapfrog Triejoin" by Todd L. Veldhuizen, arXiv: 1303.5313, March 2013. In an embodiment that is based on leapfrog trie-join, the sensitivity indexes correspond to the sensitivity data structures required for transaction repair, and the sensitivity indexes and sorted base data enable efficient incremental computation of the join result in response to deltas.

Several refinements of the basic method are possible and are presented below as alternative embodiments. In one embodiment, a batch of transactions is accepted and run concurrently under the transaction repair model, while newly arriving transactions are buffered to be run in a subsequent batch once the current batch is complete. The embodiments are not all mutually exclusive as various embodiments can be combined with other embodiments.

Figure 6:
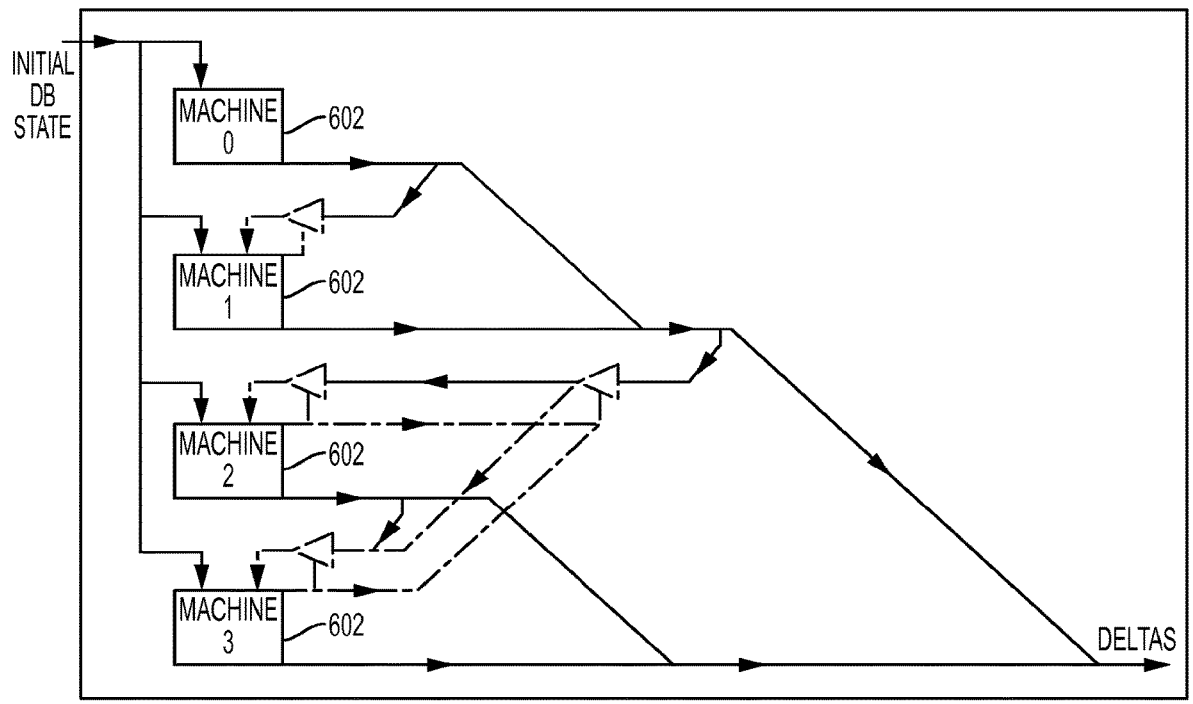
FIG. 6 depicts a transaction repair circuit operating on four machines in accordance with an embodiment.

In another embodiment, transaction repair is implemented on a cluster of machines (or computer processors) rather than a single machine. To minimize communication traffic between machines, a repair circuit can be constructed that puts all transactions from the first machine ahead of all transactions on the second machine and so on. FIG. 6 shows a transaction repair circuit operating on four machines 602 in accordance with an embodiment. For more machines, larger circuits can be constructed in a recursive fashion similar to the circuit construction methods previously described for increasing numbers of transactions.

Figure 7:
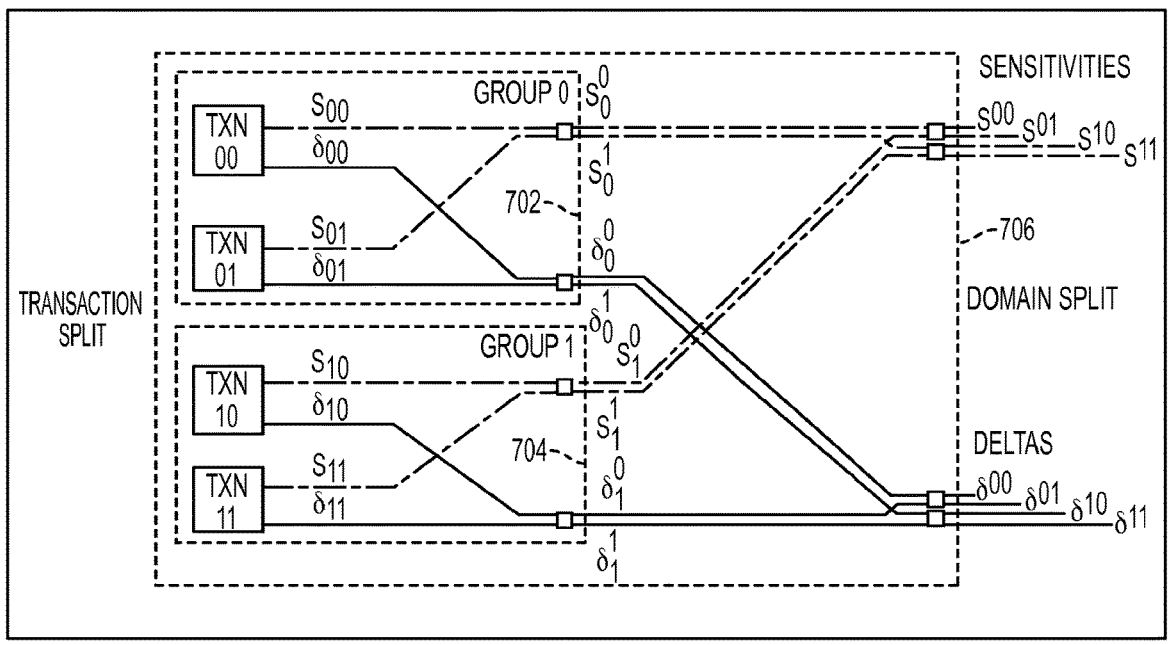
FIG. 7 depicts a domain splitting method in accordance with an embodiment.

Another embodiment can addresses the parallelism available in the higher level merge steps where the work from many transactions is processed. Because merges may be hard to parallelize, the transaction repair circuits can be augmented with a function to split the domain of sensitivities/deltas into two pieces at each level. Domain splitting can involve identifying a threshold "V" in the range of values that the domain 706 might take, and dividing the domain 706 into a portion (or group 702) of values larger than V, and a portion (or group 704) of values less than or equal to V. In this way, each coarser level of repair will have twice as many subranges as the previous level. Because higher level merges now merge many small ranges independently, rather than one large range, more parallelism can be applied to the merge process. An embodiment of this domain splitting method is illustrated in FIG. 7.

Another embodiment chooses the serialization order in a way that improves performance. For example, transactions that read the database but do not write can be serialized at the beginning, where they will never need to be repaired. Transactions that read and write similar data can be grouped together so that shorter transaction repair paths are needed. If dependencies between transactions can be identified in advance using static analysis, then placing transactions that read an item ahead of transactions that write an item will eliminate repair for that item.

In the event that there are more concurrent transactions in flight than there are threads of computation available, the system has a choice of which transactions to execute with the available threads. A embodiment of the transaction repair method gives priority to transactions that are early in the serialization order. In this way, the volume of repair work for later transactions may be reduced since they will be initiated after some of the earlier transactions have already generated their deltas.

Another embodiment uses functional versioned data structures to represent the state of transactions under repair. Such data structures make it easy to guarantee transaction isolation because transactions do not share any data. Interaction between transactions occurs only through the delta/correction pipeline.

Figure 8:
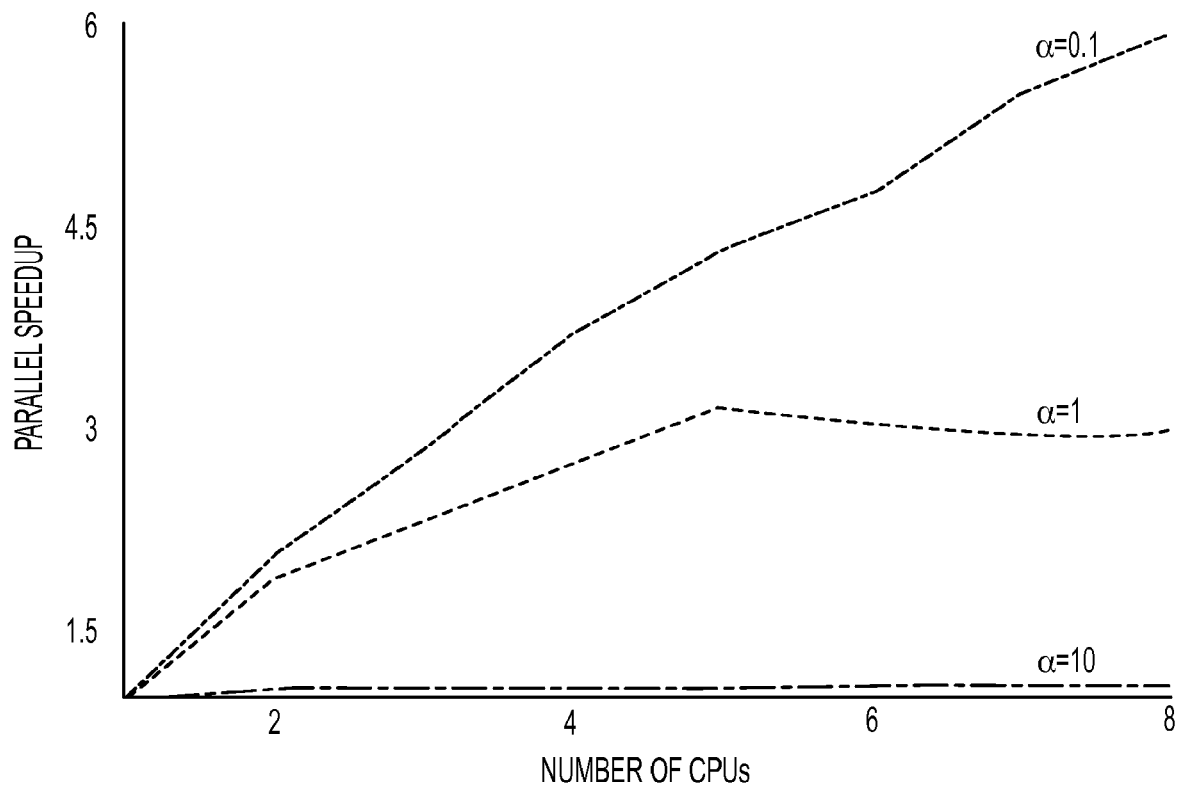
FIG. 8 depicts a graph that shows the performance of a two-phase locking method as a parameter "a" is varied.
Figure 9:
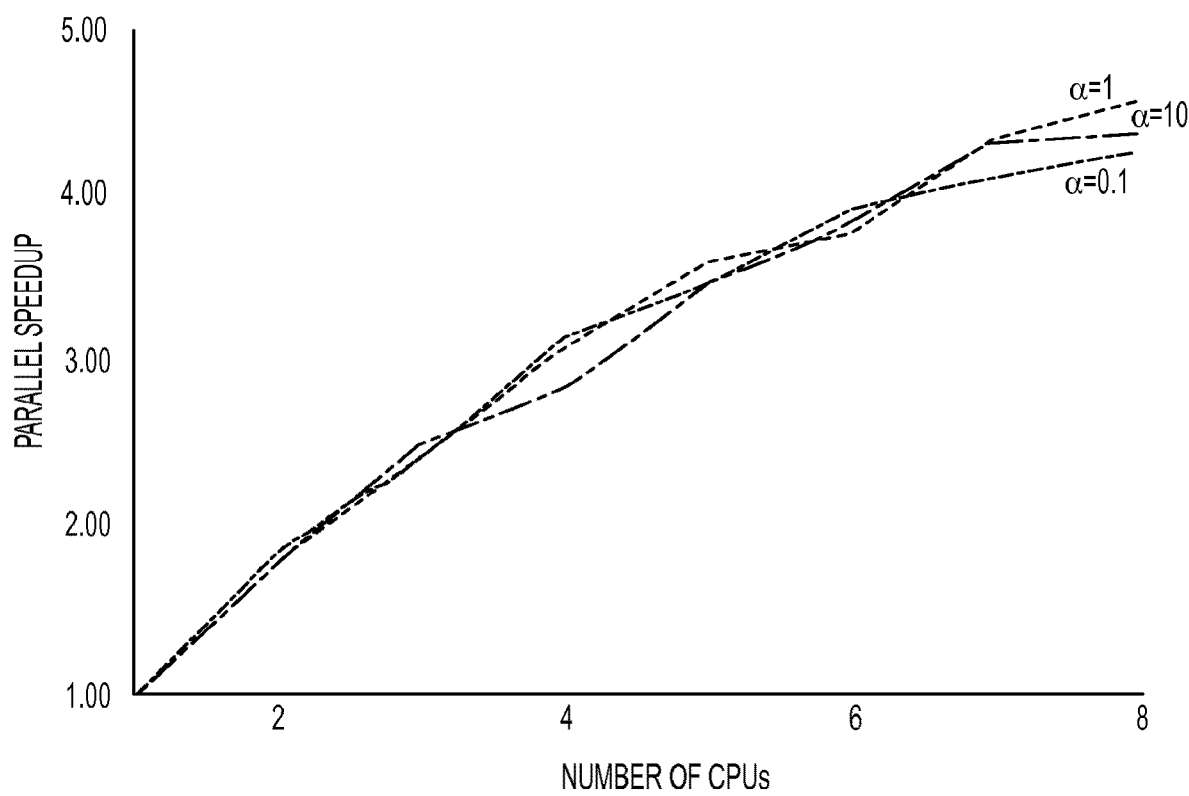
FIG. 9 depicts performance of transaction repair as an underlying concurrency control technique in accordance with an embodiment.

To illustrate some of the benefits of transaction repair, the method was implemented and evaluated in comparison with row-level locking as used in concurrency control methods such as two-phase locking. FIG. 8 shows the performance of the two-phase locking method as a parameter "α" is varied. α represents the degree of conflicting accesses, with larger values corresponding to higher expected numbers of conflicting items between transactions. For low conflict scenarios, the performance of two-phase locking scales well. However, for moderate or high conflict scenarios, scaling is limited. FIG. 9 shows the same experiment when transaction repair is used as the underlying concurrency control technique. For large values of parameter a, transaction repair can scale much better than locking.

Figure 10:
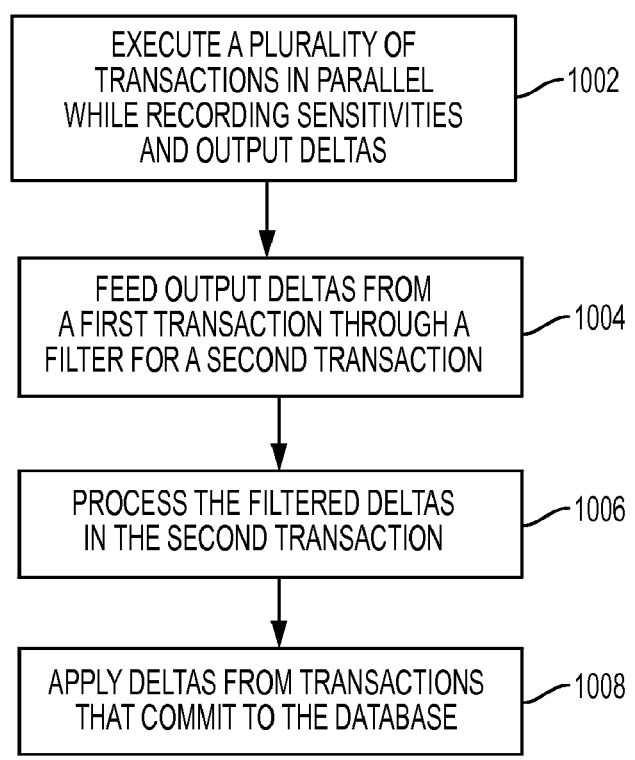
FIG. 10 depicts a process flow for executing two or more transactions over a database in accordance with an embodiment.

Referring now to FIG. 10, a process flow for executing two or more transactions over a database is generally shown in accordance with an embodiment. At block 1002, a plurality of transactions are executed in parallel while recording sensitivities and output deltas of the transactions. The sensitivity of a transaction identifies an aspect of a database whose modification has a potential of altering an output of the transaction. The output delta of the transaction indicates a change to the database state that is a result of the transaction being executed.

In an embodiment, a subset of the transactions are processed and the remaining transactions are buffered for later processing. In embodiments, the transactions are represented as purely functional data structures, which means that they do not have any side-effects that might interact with other transactions. In an embodiment, the transactions are executed by a limited number of parallel threads, and transactions earlier in the schedule are given higher priority for execution by those threads. In an embodiment, the transactions are executed on multiple machines.

At block 1004, the output deltas from a first transaction are fed through a filter for a second transaction based on the second transaction's sensitivities The filter identifies the output deltas from the first transaction that match sensitivities of the second transaction to produce "filtered deltas." At block 1006, the filtered deltas are processed in the second transaction to incrementally compute revised deltas and sensitivities for the second transaction. In an embodiment, the processing can be performed using an incremental algorithm such as a symmetric hash join or a leapfrog trie-join. At block 1008, for each transaction that successfully commits, the transaction's deltas are applied to update the database, or database state.

Figure 11:
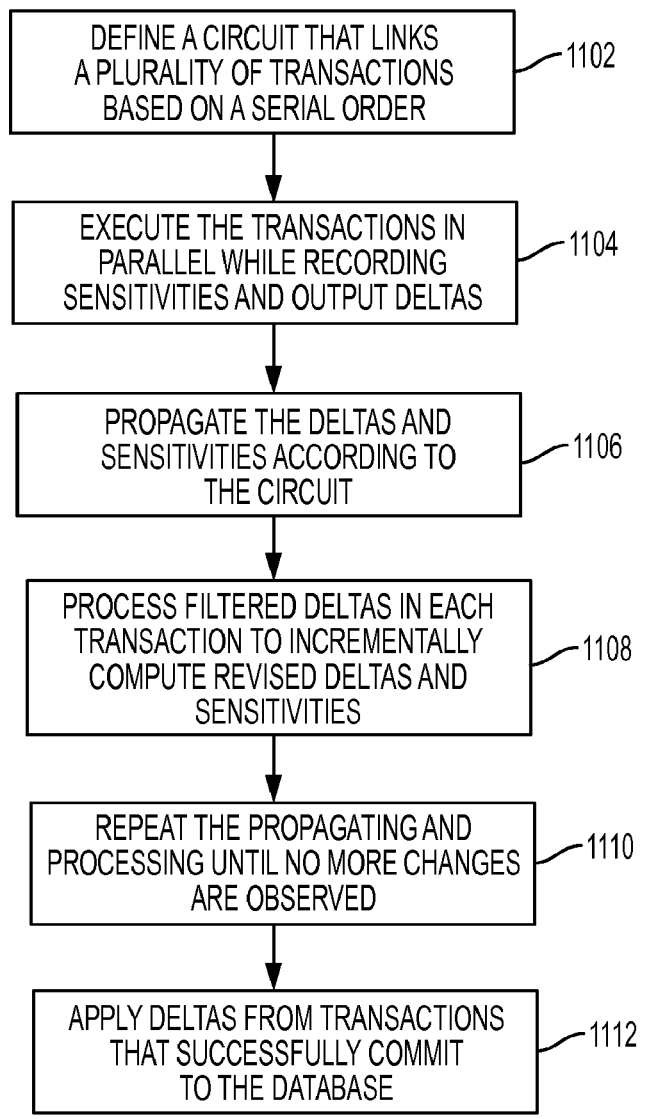
FIG. 11 depicts a process flow for executing two or more transactions over a database in accordance with an embodiment.

Referring now to FIG. 11, a process flow for executing two or more transactions over a database is generally shown in accordance with an embodiment. At block 1102, a circuit is defined that links a plurality of transactions recursively based on a serial order. In an embodiment the circuit is defined over a single machine. In another embodiment, the circuit is defined over a plurality of machines. In an embodiment, the transaction order defining the circuit is chosen to limit the complexity of transaction repair. In an embodiment, the circuit splits domains so that later merge steps are performed in parallel.

At block 1104, the transactions are executed in parallel while recording sensitivities and output deltas of the transactions. At block 1106, the deltas and sensitivities are propagated to the transactions according to the circuit. At block 1108, the filtered deltas are processed in each transaction to incrementally compute revised deltas and sensitivities. In an embodiments, the processing can be performed using an incremental algorithm such as a symmetric hash join or a leapfrog trie-join, At block 1110, the propagating and processing of blocks 1106 and 1108 are repeated until no more changes are observed. Once changes have ceased, the group of transactions has converged to a final state in which each has incorporated all changes made by transactions earlier in the serialization order. At block 1112, for each transaction that successfully commits, the transaction's deltas are applied to update the database, or database state.

Figure 12:
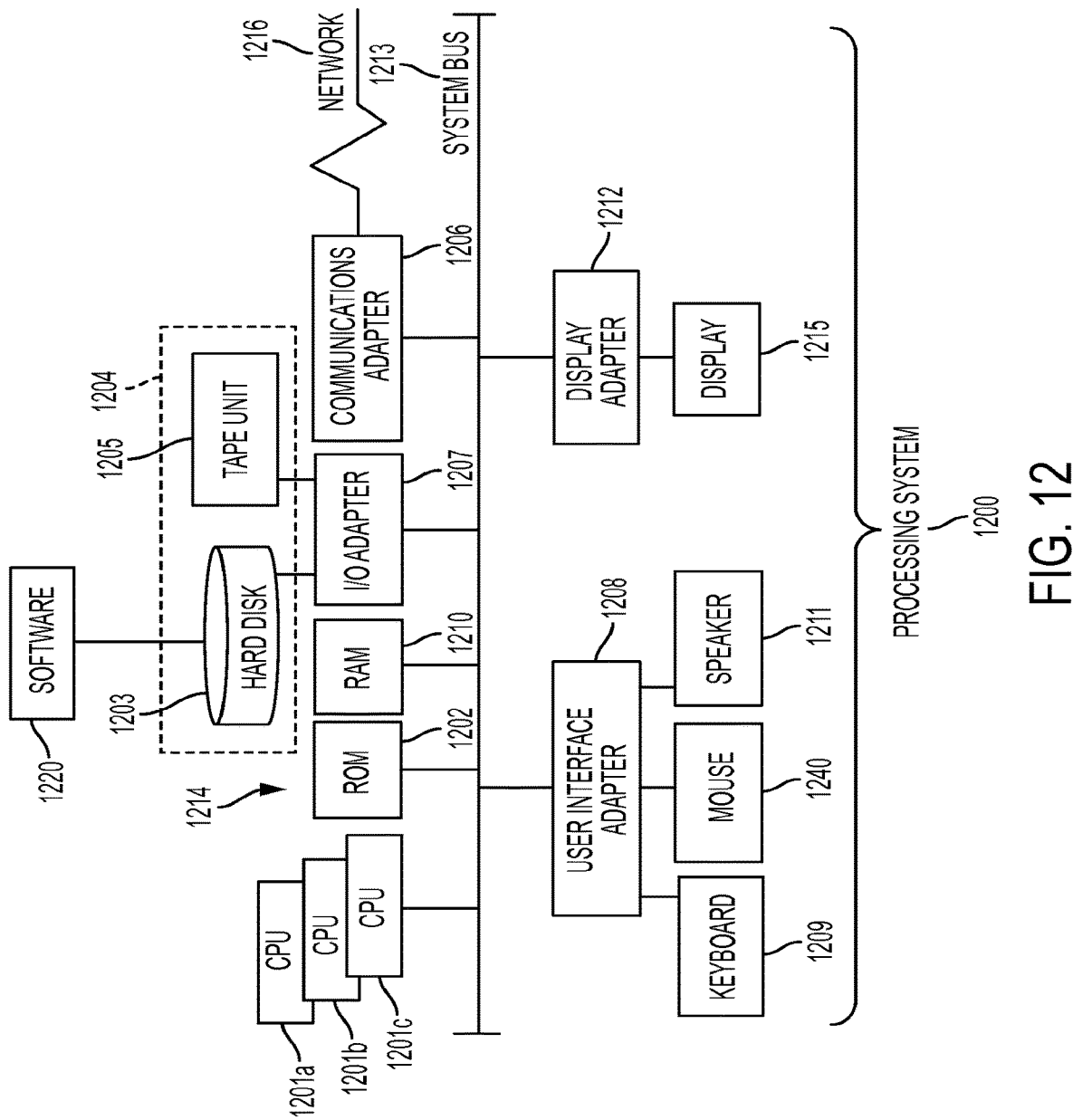
FIG. 12 depicts a block diagram of a system upon which transaction repair may be implemented in accordance with an embodiment.

Referring now to FIG. 12, there is shown an embodiment of a processing system 1200 for implementing the teachings herein. In this embodiment, the processing system 1200 has one or more central processing units (processors) 1201a, 1201b, 1201c, etc. (collectively or generically referred to as processor(s) 1201). Processors 1201, also referred to as processing circuits, are coupled to system memory 1214 and various other components via a system bus 1213. Read only memory (ROM) 1202 is coupled to system bus 1213 and may include a basic input/output system (BIOS), which controls certain basic functions of the processing system 1200. The system memory 1214 can include ROM 1202 and random access memory (RAM) 1210, which is read-write memory coupled to system bus 1213 for use by processors 1201.

FIG. 12 further depicts an input/output (I/O) adapter 1207 and a network adapter 1206 coupled to the system bus 1213. I/O adapter 1207 may be a small computer system interface (SCSI) adapter that communicates with a hard disk 1203 and/or tape storage drive 1205 or any other similar component. I/O adapter 1207, hard disk 1203, and tape storage drive 1205 are collectively referred to herein as mass storage 1204. Software 1220 for execution on processing system 1200 may be stored in mass storage 1204. The mass storage 1204 is an example of a tangible storage medium readable by the processors 1201, where the software 1220 is stored as instructions for execution by the processors 1201 to implement a circuit and/or to perform a method, such as those shown in FIGS. 1-7 and 10-11. Network adapter 1206 interconnects system bus 1213 with an outside network 1216 enabling processing system 1200 to communicate with other such systems. A screen (e.g., a display monitor) 1215 is connected to system bus 1213 by display adapter 1212, which may include a graphics controller to improve the performance of graphics intensive applications and a video controller. In one embodiment, adapters 1207, 1206, and 1212 may be connected to one or more I/O buses that are connected to system bus 1213 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1213 via user interface adapter 1208 and display adapter 1212. A keyboard 1209, mouse 1240, and speaker 1211 can be interconnected to system bus 1213 via user interface adapter 1208, which may include, for example, a Super I/O chip integrating multiple device adapters into a single integrated circuit.

Thus, as configured in FIG. 12, processing system 1200 includes processing capability in the form of processors 1201, and, storage capability including system memory 1214 and mass storage 1204, input means such as keyboard 1209 and mouse 1240, and output capability including speaker 1211 and display 1215. In one embodiment, a portion of system memory 1214 and mass storage 1204 collectively store an operating system to coordinate the functions of the various components shown in FIG. 12.

Technical effects and benefits include a database that uses versioned data structures, with each transaction running in its own branch of the database. Transactions can run simultaneously, with no locking, each in complete isolation in its branch. Conflicts are then detected and can be repaired in parallel, and the net result is a database state consistent with serial evaluation of the transactions.

In some embodiments, one or more methods are embodied in a set of instructions for one or more processors having access to one or more types of memory. The instructions could be coded in hardware or in software. Many kinds of platforms may be used, including but not limited to: computers, mobile telephones, tablet devices, game consoles, network management devices, field-programmable gate arrays, and cloud-based computer systems. Aspects of the disclosure could be deployed on multiple devices for concurrent operation. Embodiments may be used as a component of a larger system such as a database management system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention that are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Any flow diagrams depicted herein show just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A method comprising:
   executing a first database transaction and a second database transaction in parallel to compute first deltas to database data resulting from the first database transaction and second deltas to the database data resulting from the second database transaction, wherein: (i) the first database transaction comprises at least one of insertion of one or more first records into a first existing table of a database, deletion of one or more second records into the first existing table, or modification of one or more third records of the first existing table, and (ii) the second database transaction comprises at least one of insertion of one or more fourth records into a second existing table of the database table based at least in part on the first existing table, or modification of one or more sixth records of the second existing table based at least in part on the first existing table;
   determining one or more database sensitivities of the second database transaction;
   incrementally computing, in response to identifying a conflict between the first deltas and
   the one or more database sensitivities of the second database transaction, revised second deltas and revised database sensitivities of the second database transaction; and
   for each database transaction that successfully commits, applying corresponding deltas of the database transaction to update the database.

2. The method of claim 1, wherein a sensitivity of the one or more database sensitivities of the second database transaction identifies a subset of the database data operated on by the second database transaction.

3. The method of claim 1, wherein incrementally computing the revised second deltas and the revised database sensitivities for the second database transaction comprises using a symmetric hash join.

4. The method of claim 1, wherein identifying the conflict between the first deltas and the one or more database sensitivities of the second database transaction comprises using a leapfrog trie-join.

5. The method of claim 1, wherein the first database transaction and the second database transaction are represented as purely functional data structures.

6. The method of claim 1, wherein the first database transaction and the second database transaction are executed on separate machines.

7. The method of claim 1, further comprising persisting the first deltas and the revised second deltas based on the first database transaction having a higher priority than the second database transaction.

8. A system for concurrently executing two or more transactions over a database, the system comprising:
   at least one processor; and
   a memory having stored thereon computer readable computer instructions that, when executed by the at least one processor, control the at least one processor to:
   execute a first database transaction and a second database transaction in parallel to compute first deltas to database data resulting from the first database transaction and second deltas to the database data resulting from the second database transaction, wherein: (i) the first database transaction comprises at least one of insertion of one or more first records into a first existing table of the database, deletion of one or more second records into the first existing table, or modification of one or more third records of the first existing table; and (ii) the second database transaction comprises at least one of insertion of one or more fourth records into a second existing table of the database based at least in part on the first existing table, deletion of one or more fifth records into the second existing table based at least in part on the first existing table, or modification of one or more sixth records of the second existing table based at least in part on the first existing table;

determine one or more database sensitivities of the second database transaction;

incrementally compute, in response to identifying a conflict between the first deltas and the one or more database sensitivities of the second database transaction, revised second deltas and revised database sensitivities of the second database transaction; and for each database transaction that successfully commits, applying corresponding deltas of the database transaction to update the database.

9. The system of claim 8, wherein a sensitivity of the one or more database sensitivities of the second database transaction identifies a subset of the database data operated on by the second database transaction.

10. The system of claim 8, wherein incrementally computing the revised second deltas and the revised database sensitivities for the second database transaction comprises using a symmetric hash join.

11. The system of claim 8, wherein identifying the conflict between the first deltas and the one or more database sensitivities of the second database transaction comprises using a leapfrog trie-join.

12. The system of claim 8, wherein the first database transaction and the second database transaction are represented as purely functional data structures.

13. The system of claim 8, wherein the first database transaction and the second database transaction are executed on separate machines.

14. A non-transitory computer readable storage medium having stored thereon computer program code for implementing a method comprising:

executing a first database transaction and a second database transaction in parallel to compute first deltas to database data resulting from the first database transaction and second deltas to the database data resulting from the second database transaction, wherein: (i) the first database transaction comprises at least one of insertion of one or more first records into a first existing table of a database, deletion of one or more second records into the first existing table, or modification of one or more third records of the first existing table, and (ii) the second database transaction comprises at least one of insertion of one or more fourth records into a second existing table of the database based at least in part on the first existing table, deletion of one or more fifth records into the second existing table based at least in part on the first existing table, or modification of one or more sixth records of the second existing table based at least in part on the first existing table;

determining one or more database sensitivities of the second database transaction;

incrementally computing, in response to identifying a conflict between the first deltas and the one or more database sensitivities of the second database transaction, revised second deltas and revised database sensitivities of the second database transaction;

for each database transaction that successfully commits, applying corresponding deltas of the database transaction to update the database.

15. The non-transitory computer readable medium of claim 14, wherein a sensitivity of the one or more database sensitivities of the second database transaction identifies a subset of the database data operated on by the second database transaction.

16. The non-transitory computer readable medium of claim 14, wherein incrementally computing the revised second deltas and the revised database sensitivities for the second database transaction comprises using a symmetric hash join.

17. The non-transitory computer readable medium of claim 14, wherein identifying the conflict between the first deltas and the one or more database sensitivities of the second database transaction comprises using a leapfrog trie-join.

18. The non-transitory computer readable medium of claim 14, wherein the first database transaction and the second database transaction are represented as purely functional data structures.

19. The non-transitory computer readable medium of claim 14, wherein the first database transaction and the second database transaction are executed on separate machines.

20. The non-transitory computer readable medium of claim 14, further comprising persisting the first deltas and the revised second deltas based on the first database transaction having a higher priority than the second database transaction.

* * * * *